Feb. 11, 1958 W. C. PIERCE 2,823,340
MAGNETIC WORK HOLDER
Filed Feb. 16, 1956 3 Sheets-Sheet 1

INVENTOR
William C. Pierce
By Carlson, Pitzner, Hubbard & Wolfe
ATTORNEY

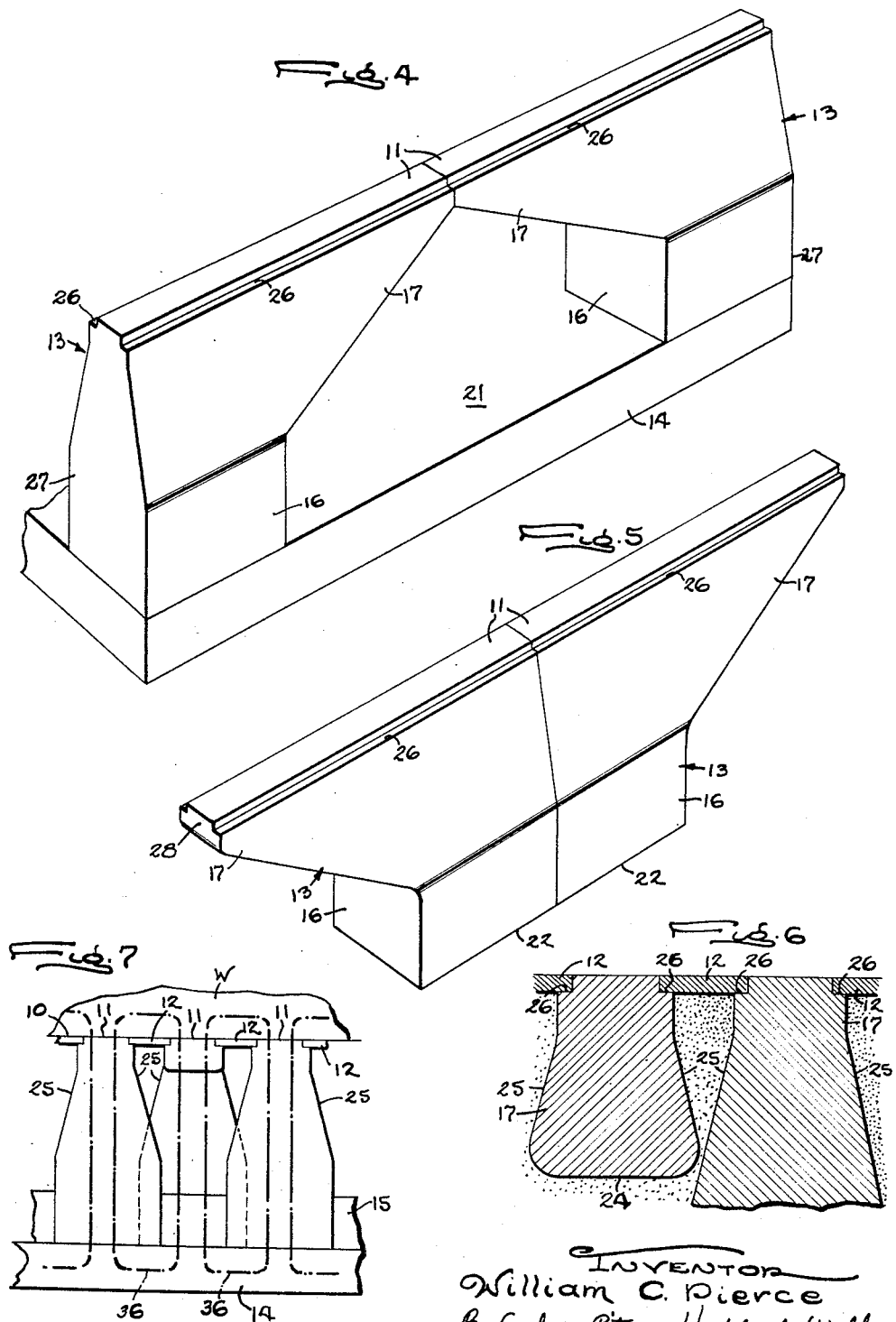

Feb. 11, 1958 W. C. PIERCE 2,823,340
MAGNETIC WORK HOLDER
Filed Feb. 16, 1956 3 Sheets-Sheet 3
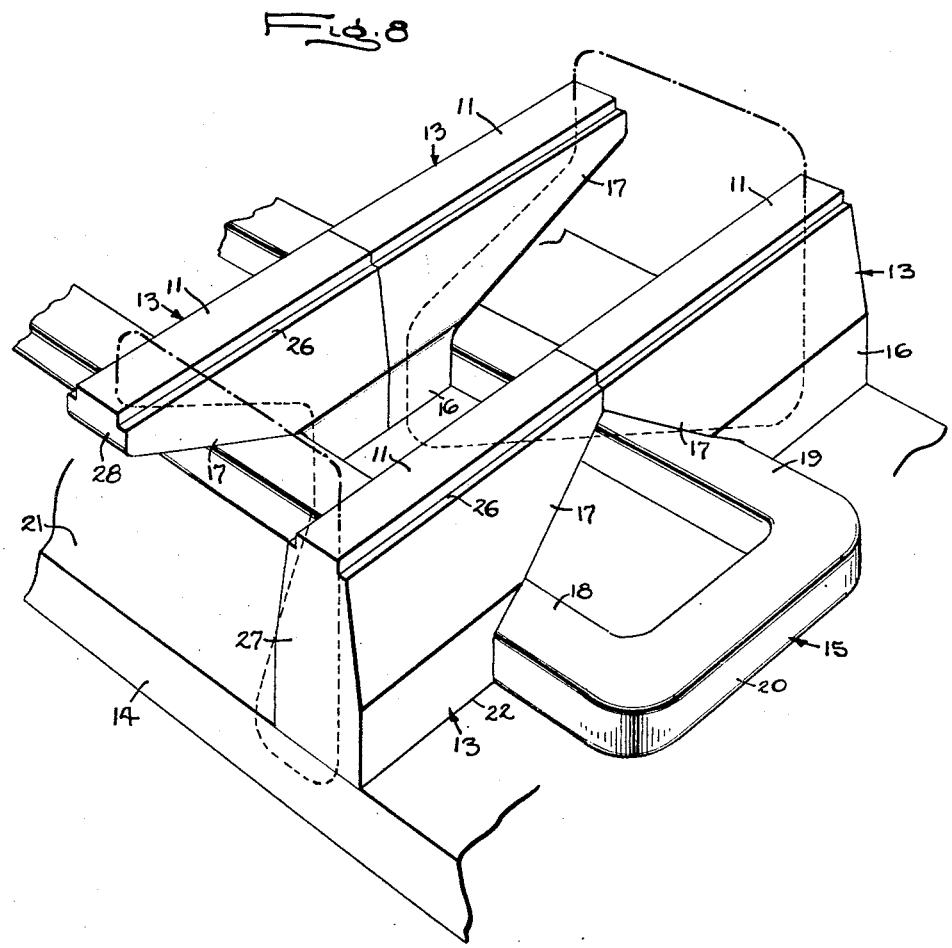
INVENTOR
William C. Pierce
By Carlson, Pitzner, Hubbard & Wolfe
ATTORNEY United States Patent Office 2,823,340
Patented Feb. 11, 1958

2,823,340

MAGNETIC WORK HOLDER

William C. Pierce, Beloit, Wis., assignor to Warner Electric Brake & Clutch Company, South Beloit, Ill., a corporation of Illinois Application February 16, 1956, Serial No. 565,931

7 Claims. (Cl. 317—163)

The present invention relates to a holder or chuck for receiving a workpiece and holding the same magnetically while the piece is being machined or otherwise worked on.

A general object of the invention is to provide a novel magnetic work holder which is highly versatile in its accommodation of workpieces of different sizes and shapes, which exerts a uniform pulling force at different parts of its work engaging surface, and which is formed of few parts of simple and economical construction readily adaptable to holders of different sizes.

Another object is to achieve simplicity and economy of manufacture of holders of different sizes and shapes by a novel construction and arrangement of pole pieces relative to a single multiple turn winding.

A more detailed object is to form the pole pieces individually as identical L-shaped members and alternate the same with each other in a novel manner relative to the winding to provide a multiplicity of flux circuits extending to the working face of the holder and to obtain uniformity of pulling force at different parts of the working face.

The invention also resides in the novel manner of shaping each pole piece to provide the desired flux carrying capacity with a minimum of magnetic material and to facilitate interdigitation of the pieces to obtain a large number of flux circuits in a given area of the working face.

Other objects and advantages of the invention will become apparent from the following detailed description taken in connection with the accompanying drawings, in which:

Figure 1 is a perspective view of a work holder embodying the novel features of the present invention, some of the parts being broken away and sectioned.

Figs. 2 and 3 are fragmentary sectional views taken respectively along the lines 2—2 and 3—3 of Figure 1.

Fig. 4 is a fragmentary perspective view showing the arrangement of the pole pieces of one pair abutting each other at the free ends of their longer legs.

Fig. 5 is a fragmentary perspective view similar to Fig. 4 showing the pole pieces of an adjacent pair abutting each other at the heels of the L's.

Fig. 6 is a fragmentary sectional view taken along the line 6—6 of Fig. 1.

Fig. 7 is a fragmentary side elevational view with the cover plate and the hardened filler removed.

Fig. 8 is a schematic fragmentary perspective view showing flux paths through two adjacent pairs of pole pieces.

Figure 1:
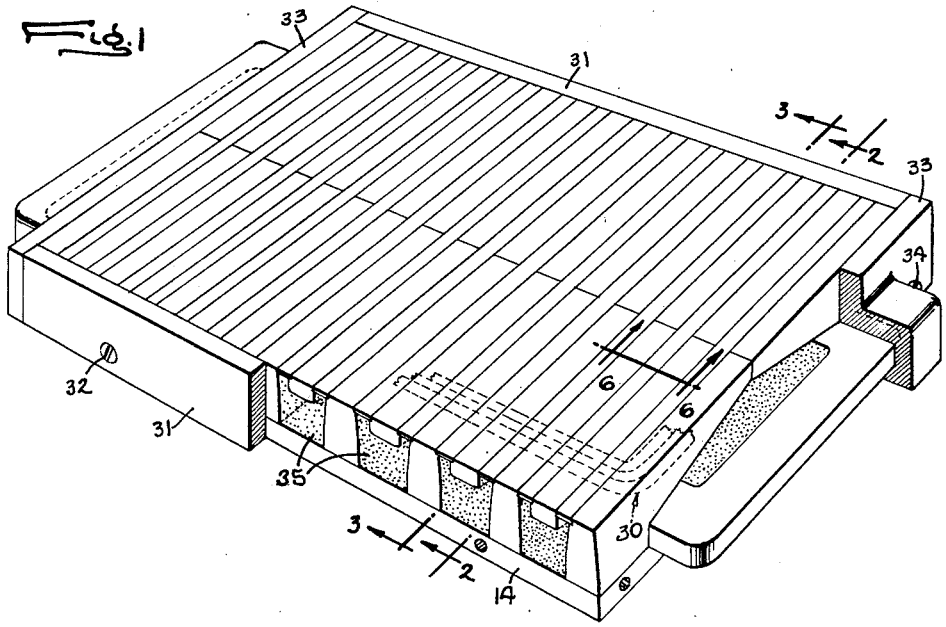

The work holder shown in the drawings to illustrate the present invention is adapted to receive one or more workpieces W of magnetic material such as steel on a composite work engaging surface 10 defined by spaced pole faces 11 and intervening nonmagnetic inserts 12. The pole faces are formed on pole pieces 13 of magnetic material which cooperate with a magnetic base 14 to define flux circuits extending to the work surface around a multiple turn winding 15. Upon energization of the latter, adjacent pole pieces are polarized oppositely to provide a magnetic flux threading back and forth between their pole faces on a workpiece bridging the faces as shown in Fig. 7, such flux attracting and holding the piece against the work surface.

In accordance with the present invention, the pole pieces 13 are constructed and arranged in a novel manner relative to the winding 15 and the base 14 to achieve simplicity and economy in the manufacture of the holder. For this purpose, each pole piece is formed separately from the base and is of the same size and generally L-shaped as the other pieces with a supporting leg 16 abutting and secured rigidly at one end to the base. The second leg 17 of each pole piece projects laterally from the other end of the supporting leg and across a section 18 of the winding 15 in overlapping relation with the second legs of adjacent pole pieces, the outer surface of the second leg opposite the winding and the supporting leg constituting a pole face 11. To provide a series of magnetic poles of alternating polarity, the second legs of the pole pieces overlap each other and are spaced apart longitudinally of the winding section and the supporting legs 16 of adjacent pieces are secured to the base on opposite sides of the section.

Uniformity of magnetic attractive force at different parts of the holder work surface 10 is obtained by making each pole face 11 of uniform width and spacing the same from the adjacent faces the same distance at all points along the lengths of the faces. For this purpose, the winding section 18 is made generally straight and the pole faces extend transversely of the section in parallel with each other. To utilize the winding efficiently, it is preferred to arrange a second straight section 19 thereof in parallel with the first section 18 and to space pole pieces of alternating polarity along the second section the same as the first, each of the pole pieces along the second section having its second leg 17 alined with the second leg of a pole piece of the same polarity extending across the first section. The pole pieces then are arranged in pairs spaced apart longitudinally of the winding sections with the supporting legs 16 of alternating pairs secured to the base 14 between the sections (Figs. 3 and 5) and the supporting legs of the intervening pairs disposed on the outer sides of the sections (Figs. 2 and 4) and having a polarity opposite to that of the alternating pairs when the winding is energized. At opposite ends, the winding sections are connected by end sections 20 to form a generally rectangular winding.

Figure 2:
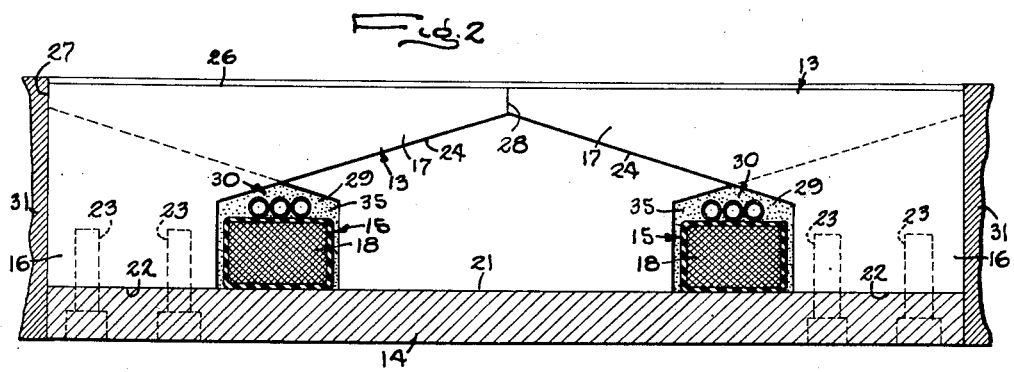
Figure 3:
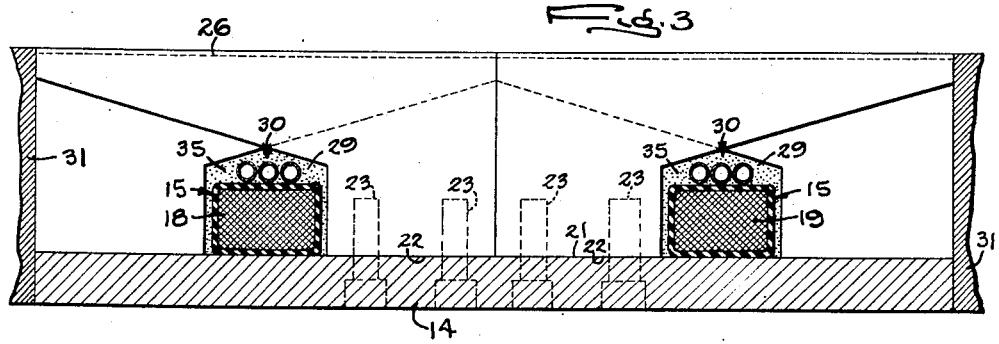

In the present instance, the base 14 is a rectangular plate providing a flat upper surface 21 supporting both straight sections 18 and 19 of the winding and abutting flat end surfaces 22 on the pole piece supporting legs 16. The latter are also of rectangular shape and are secured rigidly to the base surface as by cap screws 23 extending through the base plate and threaded into the legs (Figs. 2 and 3). To reduce the amount of magnetic material in the pole pieces 13 and still obtain uniform flux distribution at the pole faces 11, the second leg 17 of each pole piece is tapered both longitudinally and transversely by inclining a flat underside 24 thereof upwardly toward the free end of the leg from the supporting leg (Figs. 2 and 3) and by flaring flat opposite side surfaces 25 outwardly away from the pole face and toward the supporting leg (Figs. 6 and 7). Such flaring of the sides 25, in addition to reducing the amount of magnetic material, also enables the overlapping second legs and the pole faces of adjacent pole pieces in the series along each of the straight winding sections 18 and 19 to be placed close together as shown in Fig. 7 to provide a large number of flux circuits for a given area of the holder work surface 10. Along the side edges of its pole face, each second leg is recessed to provide ledges 26 for supporting the nonmagnetic inserts 12 which herein are rectangular and provide exposed surfaces lying flush with the pole faces in a common plane paralleling the flat plate surface 21.

At the heel of the L, each pole piece 13 is formed with a flat surface 27 flush with the outer side of the supporting leg and normal to the flat surface 22 of the latter and the pole face. Also, the second leg 17 of the piece terminates at its projecting end in a flat surface 28 normal to the pole face. Thus, the pole pieces of each pair along the winding sections 18 and 19 may abut each other between the sections for extension of the pole faces continuously across the width of the work engaging surface 10 even though the pieces of adjacent pairs are reversed end for end. The pole pieces whose supporting legs abut the base plate between the winding sections abut each other at the heels of the L's as shown in Fig. 5 while the pieces of the adjacent pairs abut each other at the ends of the second legs as shown in Fig. 4.

To enable heat to be transferred away from the winding 15, the second legs 17 of the pole pieces 13 are spaced from the base surface 21 a distance greater than the thickness of the winding to define a passage 29 extending along the winding to receive pipes 30 for cooling fluid as shown in Fig. 2. In this instance, this passage is located between and defined by the winding and the undersides 24 of the second legs with the pipes lying directly on the winding.

In the assembly of the holder, after the winding 15 with the cooling pipes 30 thereon has been laid flat against the plate surface 21, the supporting legs 17 of the pole pieces 13 are secured in place on opposite sides of the winding sections with the cap screws 23. Next, the sides of the holder are covered by side plates 31 of nonmagnetic material secured as by screws 32 to the pole pieces and the side edges of the base plate 14 and the ends of the holder are covered by nonmagnetic end plates 33 recessed to receive the end winding sections 20 and secured to the ends of the base plate and the end pole pieces by screws 34 and to the end edges of the side plates 31 by welding or soldering. The cover and base plates define a liquid tight pan which is filled to a level below the ledges 26 for the inserts 12 with a suitable cement 35 for holding the winding and the pipes 30 in place, the filler in this instance being a mixture of sand and varnish which is hardened by baking. Suitable connections (not shown) are extended through one of the end plates for the transmission of cooling fluid to the pipes 30 and electric current to the winding. Following the baking operation, the inserts 12 which preferably are formed of a wear resistant material such as tungsten carbide are cemented in place against the ledges 26 to complete the assembly. Finally, the pole faces 11 and the exposed surfaces of the inserts are ground to form a smooth work engaging surface 10 and the holder is ready for use.

Upon energization of the winding 15, the pole pieces 13 of adjacent pairs become magnetic poles of opposite polarity due to location of their supporting legs 16 on opposite sides of the winding sections 18 and 19. Thus, when a magnetic workpiece W is placed on the holder surface 10 to bridge the adjacent pole faces 11 as shown in Fig. 7, a magnetic flux threads back and forth between the pieces and the work to attract the latter against the work surface 10. Each of the closed circuits for this flux as indicated by a line 36 in Fig. 7 is defined by the pole pieces and the base plate 14 and extends around the winding away from and back to the work surface 10 in succession through one pole piece, the base plate and the adjacent pole piece. The flux circuits between pole pieces of adjacent pairs also are indicated in Fig. 8 by lines 37, the dotted parts of which extend through the magnetic parts of the holder and the dot-dash parts of which extend through the work (not shown). Such circuits are established through each set of adjacent pole pieces bridged by a magnetic workpiece. To release the latter, the winding is deenergized thereby reducing the flux and permitting the piece to be lifted away from the work surface.

It will be apparent from the foregoing that the identical construction and generally L-shape of the pole pieces 13 and their arrangement relative to the winding 15 not only contributes to the simplicity and economy of manufacture of the holder by facilitating formation of the pieces and their attachment to the base 14, but also makes possible the provision of a multiplicity of flux circuits 36 with uniformity of attractive force at different parts of the working surface 10. Another advantage of the identical construction of the pole pieces lies in the ease of formation of holders of different sizes merely by varying the lengths of the winding sections 18 and 19 and changing the number of pole pieces accordingly. The taper of the second leg 17 of each pole piece results in a saving of magnetic material while retaining uniformity of flux distribution at the pole faces and achieving close placement of the adjacent overlapping pole pieces of opposite polarities.

I claim as my invention:

1. A work holder, having, in combination, a base of magnetic material providing a flat supporting surface, a multiple turn winding of generally rectangular shape having spaced parallel straight sections lying flat against said surface, a plurality of pole pieces of the same construction and generally L-shape arranged in pairs spaced apart longitudinally of said winding sections, each of said pole pieces of each pair having a first leg abutting and rigidly secured to said base surface on one side of one of said winding sections and another leg extending transversely across the winding section and alined with the other leg of the other pole piece of the pair, and inserts of nonmagnetic material secured to and separating adjacent pairs of said pole pieces magnetically from each other, the pole pieces of alternating ones of said pairs abutting said base surface between said winding sections and the pole pieces of the intervening pairs abutting the base surface outside of the winding sections whereby the pole pieces of adjacent pairs become magnetic poles of opposite polarity when said winding is energized.

2. A magnetic work holder having, in combination, a base of magnetic material, a multiple turn winding supported on said base and having two laterally spaced elongated sections, a plurality of pole pieces of the same construction and generally L-shape arranged in pairs spaced apart longitudinally of said winding sections, each of said pole pieces of each pair having a first leg abutting and secured rigidly to said base on one side of one of said winding sections and another leg extending transversely across the section and alined with the other leg of the other pole piece of the pair, and inserts of nonmagnetic material secured to but magnetically separating adjacent pairs of said pole pieces, the pole pieces of alternating ones of said pairs abutting said base between said winding sections and the intervening pole pieces abutting the base outside of the winding sections whereby the pole pieces of adjacent pairs become magnetic poles of opposite polarity upon energization of said winding.

3. A magnetic work holder, having, in combination, a base of magnetic material providing a flat supporting surface, a multiple turn winding having a straight section supported on said base, a plurality of first pole pieces of the same construction and generally L-shape spaced apart longitudinally of said section and each having a first one of its legs abutting and rigidly secured to said base surface on one side of said section with its other leg extending transversely across the section and providing a pole face lying in a common plane paralleling the surface, a plurality of second pole pieces of the same construction as said first pieces having their first legs secured to and abutting said surface on the other side of said section with their other legs extending across the section and intervening between but spaced from the other legs of the first pieces with their pole faces lying in said plane, inserts of nonmagnetic material secured to and separating said other legs of said first pieces from the other legs of the second pieces and having work engaging surfaces flush with said pole faces, said other legs being spaced from said base a distance greater than the thickness of said winding section to define a passage extending longitudinally of and adjacent the latter, and coolant pipes extending through said passage and lying against said winding section to transfer heat away from the section.

4. A magnetic work holder having, in combination, a base of magnetic material providing a flat supporting surface, a plurality of pole pieces of magnetic material of the same construction and generally L-shape each having a first leg terminating at its free end in a flat surface and a second leg tapering outwardly toward its free end from the heel of the L and providing a pole face of uniform width extending the length of the leg and facing oppositely from but paralleling the flat end surface of the first leg, said second leg of each of said pieces having side surfaces tapering toward each other and said pole face from said first leg, a multiple turn winding supported on said base and having a straight section extending along said surface thereof, means securing said end surface of each of said first legs rigidly in abutment with said base surface on one side of said winding section with said second legs extending transversely across the section in parallel and overlapping relation with each other and spaced apart longitudinally of the section, said first legs of alternating ones of said pole pieces being disposed on one side of said section with the first legs of the intervening pieces on the opposite side of the section whereby the second legs of adjacent pole pieces become magnetic poles of opposite polarity upon energization of the winding, and nonmagnetic inserts secured rigidly to and magnetically separating said second legs of adjacent pole pieces and providing work engaging surfaces lying flush with said pole faces in a common plane paralleling said base surface.

5. A magnetic work holder, having, in combination, a base of magnetic material providing a flat supporting surface, a plurality of pole pieces of magnetic material of the same construction and generally L-shape each having a first leg terminating at its free end in a flat surface and a second leg providing a flat pole face extending the length of the second leg and facing in the opposite direction from the flat surface of the first leg, a multiple turn winding supported on said base and having a straight section extending along said supporting surface thereof, means securing said end surface of each of said first legs rigidly in abutment with said base surface on one side of said winding section with said second legs overlapping each other and extending transversely across and spaced apart longitudinally of the section, said first legs of alternating ones of said pole pieces being disposed on one side of said section with the first legs of the intervening pieces on the opposite side of the section whereby the second legs of adjacent pole pieces become magnetic poles of opposite polarity upon energization of the winding, and nonmagnetic inserts secured rigidly to and magnetically separating said second legs of adjacent pole pieces and providing work engaging surfaces lying flush with said pole faces in a common plane.

6. A magnetic work holder, having, in combination, a base of magnetic material providing a flat supporting surface, a multiple turn winding having a straight section supported on said base, a plurality of first pole pieces of the same construction and generally L-shape spaced apart longitudinally of said section and each having a first one of its legs abutting and rigidly secured to said base surface on one side of said section with its other leg extending transversely across the section and providing a pole face lying in a common plane paralleling the surface, a plurality of second pole pieces of the same construction as said first pieces having their first legs secured to and abutting said surface on the other side of said section with their other legs extending across the section and intervening between but spaced from the other legs of the first pieces with their pole faces lying in said plane, and inserts of nonmagnetic material secured to and separating said other legs of said first pieces from the other legs of the second pieces and having work engaging surfaces flush with said pole faces.

7. A magnetic work holder having, in combination, a base of magnetic material, a multiple turn winding having an elongated section supported on said base, a plurality of pole pieces of the same construction and generally L-shape spaced apart longitudinally of said winding section and each having a first leg secured rigidly to and abutting said base on one side of the section and another leg extending transversely across the section in parallelism with the other legs of the other pole pieces, and inserts of nonmagnetic material secured to but magnetically separating adjacent ones of said pole pieces, alternating ones of said pole pieces abutting said base on one side of said winding section and the intervening pole pieces abutting the base on the other side of the section whereby adjacent pole pieces are of opposite polarity when the winding is energized.

References Cited in the file of this patent

UNITED STATES PATENTS

| | | |
|---|---|---|
| 949,351 | Clayton | Feb. 15, 1910 |
| 1,451,268 | Morgan et al. | Apr. 10, 1923 |